M. S. CHAPMAN.
PASTRY.
APPLICATION FILED NOV. 7, 1914.
1,174,826.
Patented Mar. 7, 1916.
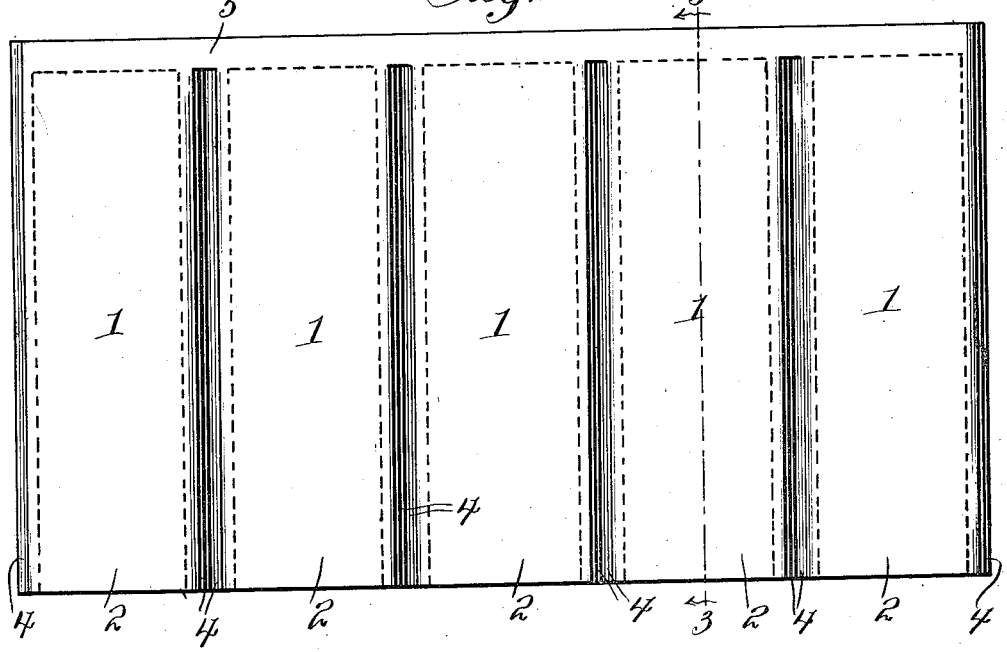
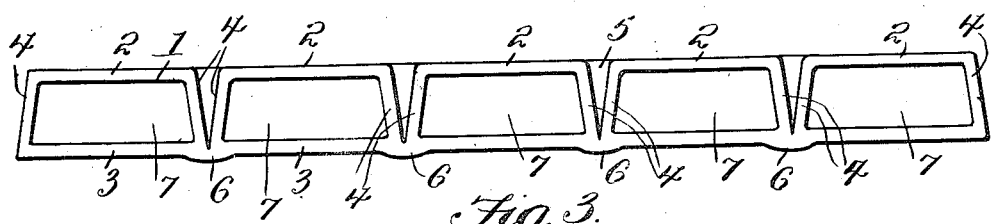
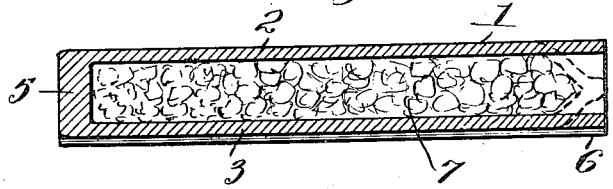
Inventor
M. S. Chapman
Witnesses
By Victor J. Evans
Attorney

UNITED STATES PATENT OFFICE.

MELVILLE S. CHAPMAN, OF ELKHART, INDIANA.

PASTRY.

1,174,826.

Specification of Letters Patent. Patented Mar. 7, 1916.

Application filed November 7, 1914. Serial No. 870,886.

*To all whom it may concern:*

Be it known that I, MELVILLE S. CHAPMAN, a citizen of the United States, residing at Elkhart, in the county of Elkhart and State of Indiana, have invented new and useful Improvements in Pastry, of which the following is a specification.

This invention relates to pastry and more particularly to pies.

The principal object of the invention is to provide a pie constructed of a plurality of non-communicating sections joined together by a portion of the pastry in such manner that the sections may be conveniently severed and may be handled without spilling the contents.

Another object of the invention is the provision of a pie constructed of a plurality of sections joined together by separable portions of the pastry and constructed in such shape that they may be conveniently placed in the mouth and eaten from the hand without spilling any of the contents of the section.

Still another object of the invention is to provide a pie constructed of a plurality of non-communicating sections so that all of the sections of the pie may contain different ingredients.

Further objects of the invention will appear as the following description is read in connection with the accompanying drawing, which forms a part of this application, and in which:—

Figure 1 is a top plan view. Fig. 2 is an edge elevation. Fig. 3 is a sectional view on the line 3—3 of Fig. 1.

Referring more particularly to the drawing, the pie is constructed of a plurality of sections 1 each consisting of top, bottom and side walls 2, 3 and 4 and one end wall 5. The sections are joined together by the end wall 5 which is continuous from side to side of the pie and by frangible portions 6 which connect the lower or bottom walls of the sections, as shown. The rear end wall 5 of the sections is made of greater thickness than any of the other walls so as to reinforce the structure and prevent its breaking under ordinary circumstances. Each section 1, therefore, provides a compartment 7 which may be filled as desired with any suitable substance, such as mincemeat, chocolate meringue or apples.

In practice, the pies may be baked and kept in stock so as to be filled with any filling desired by the customer or they may be filled before baking and the upper and lower walls 2 and 3 pinched together, as is customary in joining the bottom and top crusts of pies.

What is claimed is:—

1. An edible article of pastry comprising a plurality of non-communicating separable filling containing compartments, and means connecting the compartments which closes one end thereof.

2. An edible article of pastry comprising a plurality of filling containing compartments, destructible connections therebetween and means connecting the compartments which closes one end thereof.

3. An edible article of pastry comprising a plurality of compartments separably joined together and means connecting the compartments which closes one end thereof.

4. An edible article of pastry comprising a plurality of non-communicating filling containing compartments, edible bridges connecting said compartments and being frangible for the convenient separation of the compartments and an edible connecting means closing one end of said compartments.

5. A pie comprising a plurality of non-communicating filling containing compartments, closed at one end and separated edible bridges connecting said compartments and being frangible for the convenient separation of said compartments.

In testimony whereof I affix my signature in presence of two witnesses.

MELVILLE S. CHAPMAN.

Witnesses:
L. D. HALL,
H. S. CHAPMAN.